(12) United States Patent
Hikabe (10) Patent No.: US 7,761,640 B2
(45) Date of Patent: *Jul. 20, 2010

(54) SLOT INTERFACE ACCESS DEVICE, SLOT INTERFACE ACCESS METHOD, AND PROGRAM THEREFOR

(75) Inventor: Akinori Hikabe, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 63 days.

This patent is subject to a terminal disclaimer.

(21) Appl. No.: 12/119,524

(22) Filed: May 13, 2008

(65) Prior Publication Data

US 2008/0294828 A1 Nov. 27, 2008

(30) Foreign Application Priority Data

May 21, 2007 (JP) ............................. 2007-133959

(51) Int. Cl.
G06F 13/36 (2006.01)
G06F 13/00 (2006.01)
G06F 13/14 (2006.01)
G06F 13/38 (2006.01)

(52) U.S. Cl. ..................... 710/300; 710/305
(58) Field of Classification Search ................ 710/300, 710/305
See application file for complete search history.

(56) References Cited

U.S. PATENT DOCUMENTS 6,243,774 B1* 6/2001 Eide et al. ................... 710/302
6,427,176 B1* 7/2002 Berglund et al. ............... 710/8
6,782,464 B2* 8/2004 Blackmore et al. .......... 711/202
6,928,503 B1* 8/2005 Mosgrove .................... 710/302
7,146,497 B2* 12/2006 Almeida et al. ............. 713/100
7,363,404 B2* 4/2008 Boyd et al. .................. 710/104
7,516,252 B2* 4/2009 Krithivas ..................... 710/37
2003/0037185 A1* 2/2003 Davis et al. .................... 710/1
2004/0085965 A1 5/2004 Fotedar
2007/0094427 A1* 4/2007 Chan et al. .................. 710/104
2008/0147937 A1* 6/2008 Freimuth et al. ............ 710/104

FOREIGN PATENT DOCUMENTS

JP 2003-34507 12/2003
WO WO97/35255 9/1997

OTHER PUBLICATIONS

European Patent Office issued an European Search Report dated Nov. 26, 2008, Application No. 08156199.5.

* cited by examiner

Primary Examiner—Ryan M Stiglic
(74) Attorney, Agent, or Firm—Young & Thompson (57) ABSTRACT

A slot interface access device including a slot management module; a slot control module; and a physical slot to management slot contrast table, the slot management module, the slot control module, and the physical slot to management slot contrast table being provided between an input and output control module and a slot interface lower than the input and output control module. The input and output control module accesses the slot interface using virtual slot identification information. The slot management module converts the virtual slot identification information into physical slot identification information while referring to the physical slot to management slot contrast table, and accesses the slot control module corresponding to the physical slot identification information obtained by conversion, thereby realizing a physical access of the input and output control module to the slot interface.

9 Claims, 8 Drawing Sheets

| PHYSICAL SLOT | VIRTUAL SLOT |
|---|---|
| SYSTEM 1, SLOT 1 | SLOT 1 |
| SYSTEM 1, SLOT 2 | SLOT 2 |
| SYSTEM 2, SLOT 1 | SLOT 3 |
| SYSTEM 3, SLOT 1 | SLOT 4 |
| SYSTEM 3, SLOT 2 | SLOT 5 |
|  |  |

SLOT INTERFACE ACCESS DEVICE, SLOT INTERFACE ACCESS METHOD, AND PROGRAM THEREFOR

RELATED APPLICATIONS

This application is based upon and claims the benefit of priority from Japanese patent application No. 2007-133959, filed on May 21, 2007, the disclosure of which is incorporated herein in its entirety by reference.

BACKGROUND OF THE INVENTION

1. Field of the Invention

The present invention relates to a slot interface access device for accessing slot interfaces present to be distributed in a plurality of main devices, and a method and a program therefor.

2. Description of the Related Art

There is conventionally known a technique for connecting main devices to one another by a network and for allowing each of the main devices to use functions of the other main devices as disclosed in, for example, International Publication No. 1997/35255. The "main device" means herein a device that includes an interface accommodating therein a terminal (e.g., a button telephone), an interface connecting the main device to a public line, and an interface connecting the main device to an IP network.

However, to enable the main devices to mutually use functions of the others via the network, it is necessary to alternate their functions, respectively. The non-alternated functions are not compliant with the network, so that the other main devices are incapable of using all functions of a certain main device via the network.

Namely, with the conventional technique, in the architecture of networking connection among the main devices, CPUs of the main devices manage resources, respectively and manage states of terminals, lines and the like separately. Due to this, to enable each of the main devices to actuate the functions of the other main devices via the network is not so simple as actuating its own functions but it is disadvantageously necessary to alter the functions so as to be compliant with the network.

Furthermore, in case of conventional networking systems, the systems manage slots for packages that are resources of each main device separately. Due to this, each system is unable to know information, states, and the like of resources of the other systems. As a result, restrictions are imposed on use of functions of the other main devices on the network.

SUMMARY OF THE INVENTION

It is an object of the present invention to construct a networking system architecture that can facilitate managing information and that is free from restrictions to functions by allowing one main device to integrally manage information such as resources of hardware of all main devices connected to one another by a network.

The present invention can solve the conventional problems by causing one main device to integrally manage all resource information that is conventionally managed by respective main devices and to integrally exercising call control.

Namely, one main device, i.e., a master main device integrally and entirely monitors and controls terminals, lines and the like of the other main devices connected to the network, thereby making it possible for the master main device to handle the resources on the network as if the resources on the network are connected to the master main device.

Namely, the master main device can handle the terminals and lines of the other main devices or systems as if they are its own terminals and lines. Due to this, there is no need to alter the functions of the main devices so as to be compliant with the network differently from the conventional technique, and there is no need, in particular, to be conscious of the network.

Furthermore, it is possible to use all the functions of all the main devices including those currently incompliant with the network on the network.

Moreover, the present invention can avoid the conventional problems by causing one main device or master main device to integrally manage slots of all the main devices connected to the network.

Namely, the master main device that controls all call processings on the network can integrally manage slots of the master main device and those of slave main devices connected to the master main device, and can handle even the slots of the other main devices or systems as if they are its own slots.

By doing so, the mater main device can manage all information on the slots on the network. At the same time, the master main device can handle all resources such as terminals and lines connected to packages installed into the respective slots as if they are its own resources.

According to the present invention, it is possible to theoretically use all functions of all the main devices on the network. According to the conventional technique, main devices basically operate independently of one another, and it is necessary to specially alter or change each of the functions so that the main devices can operate in cooperation with one another. According to the present invention, by contrast, a mechanism absorbing network difference into a lower layer, whereby higher layers can function without consciousness of the network.

Moreover, by using the present invention, it is possible to construct a highly reliable networking system architecture. According to the conventional technique, the main devices operate independently of one another and manage resources separately. Due to this, the conventional technique has the problem that there is a contradiction in state among the resources depending on timing. The present invention can solve the conventional problem.

Furthermore, according to the present invention, the functions are constructed on the lowest layer of each of the main devices. Due to this, only by creating the lower layer without problem, the higher layers do not malfunction. Besides, the central control over the resources can prevent contradictions in state among the resources.

Further, by using the present invention, it is possible to construct a mechanism that can dispense with consciousness of the networking system architecture although the networking system architecture is present.

Moreover, by introducing the mechanism absorbing network difference into the lowest layer in terms of processing, the higher layers (applications) can use the functions of lower layer without consciousness of the network.

This can dispense at all with the processing compliant with the network that has been conventionally necessary to perform at application level. It is thereby possible not only to greatly decrease the number of man-hours for network compliance but also to improve quality.

It is thereby possible to eliminate the great number of man-hours conventionally required to alter the functions so as to be compliant with the network and improve quality.

DESCRIPTION OF THE PREFERRED EMBODIMENTS

An embodiment of the present invention will be described hereinafter in detail with reference to the accompanying drawings.

The gist of the embodiment lies in a technique for allowing each main device to handle resources on the network as if they are its own resources.

In the main device operating under program control, hardware resource management, that is, management of terminals, lines and the like is made in the form of package management.

Therefore, to allow each main device to handle resources on the network as if they are its own resources, it suffices that the main device handles packages on the network as if they are its own packages.

Figure 1:
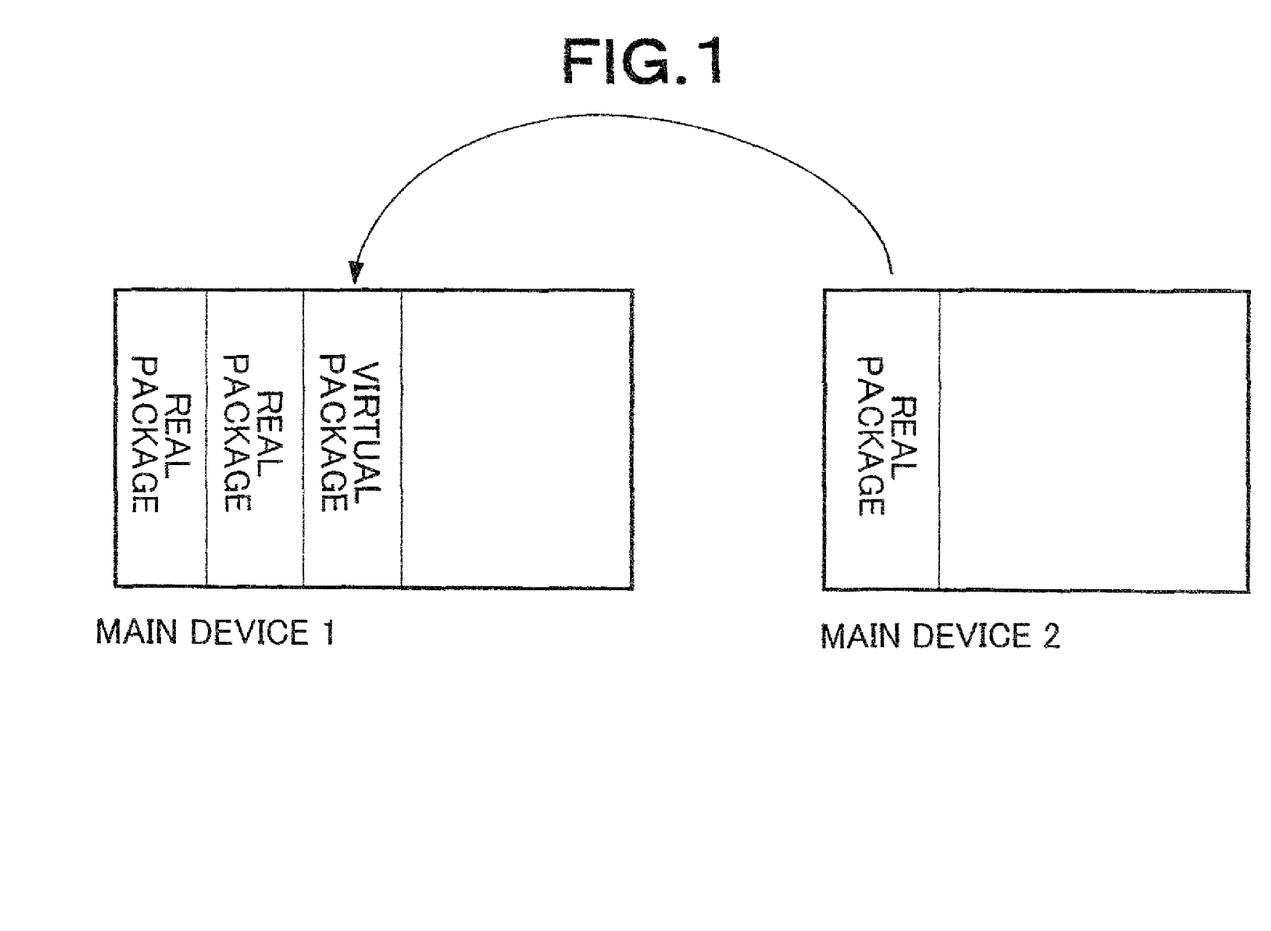
FIG. 1 is a conceptual diagram showing a manner in which one main device handles a real package of the other main device as a real package of one main device using a virtual package according to an embodiment of the present invention.

FIG. 1 is a conceptual diagram of package management on the network.

If a package is installed into a main device 2, information on the package and information on a terminal, a line and the like connected to the package are transmitted to a main device 1 via the Ethernet (registered trademark).

On the main device 2 side, since these pieces of information are not at all transmitted to a package control unit or a call control unit of the main device 2, it does not appear to the main device 2 that a situation changes.

On the main device 1 side, since a lower layer processes data transmitted from the main device 2 and it appears as if the information arrives from a slot of the main device 1, it appears to the main device 1 that the package is input to the slot of the main device 1.

Furthermore, as for a command to the package (downstream data), the lower layer of the main device 1 processes the downstream data and transmits a command to a virtual package to a real package on the network.

By introducing this mechanism, it is possible for each main device to handle resources on the network as if they are its own resources.

Therefore, a higher layer of each main device such as the call control unit can freely use resources without knowledge that the resources are present on the network.

Figure 2:
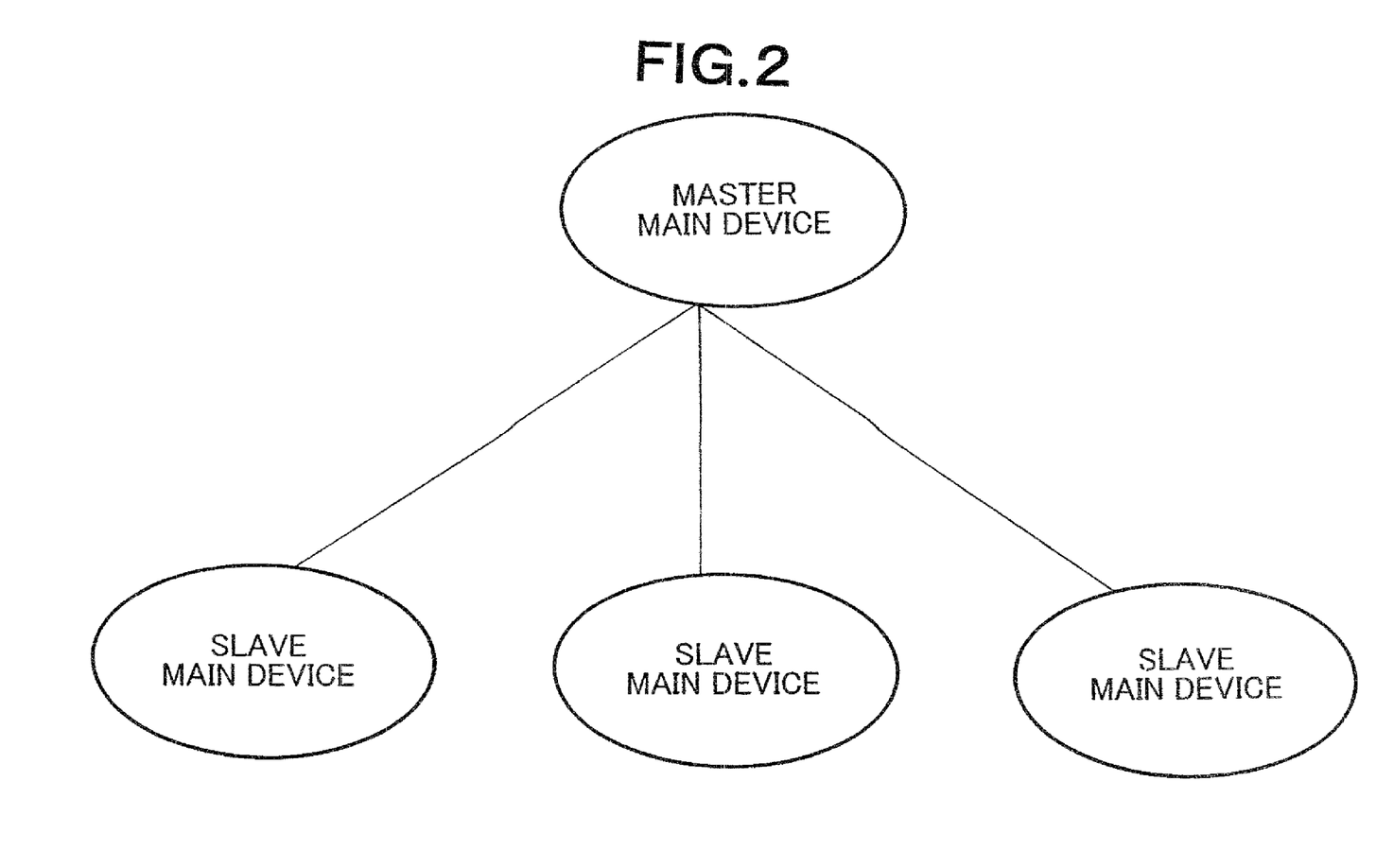
FIG. 2 is a conceptual diagram showing an example of connection among a master main device and slave main devices according to the embodiment.

FIG. 2 is a configuration diagram of the networking system architecture according to the embodiment of the present invention.

A main device managing all the resources on the network and exerting all call controls is referred to as "master".

A main device connected to the master, providing package information to the master, and obeying commands from the master is referred to as "slave".

To establish the networking system architecture according to the embodiment, it is necessary that one of a plurality of main devices constituting the network acts as a master. All slaves are connected to the master, obey commands from the master, and do not perform any processings such as call control. Namely, even if a slave includes a functional unit performing call control or the like, the unit is in a dormant state.

The master can control a plurality of slaves and can handle resources of the main devices connected to the master as the slaves as if they are all its own resources.

The networking system architecture constituted by the master and the slaves can thereby act as if it is one system.

It is necessary to set, in advance, information as to which main device acts as a master or a slave and information as to by which IP address each of the main devices is connected to the master.

The main device set as the master awaits connection from the slaves and each of the slaves establishes connection to a preset IP address of the master.

In this way, after the connection between the master and the slaves is established, transmission of package information and the like are performed and the network operates as such.

If the master goes down, all the main devices connected to the master become unavailable. To prevent this problem, if the master goes down, one of a plurality of slaves acts as a master to execute roles of the master for the original master (Redundancy Function).

It is necessary to set, in advance, information as to which slave substitutes for the master if the master goes down.

A specific method for central control over resources on the network will next be described.

Figure 3:
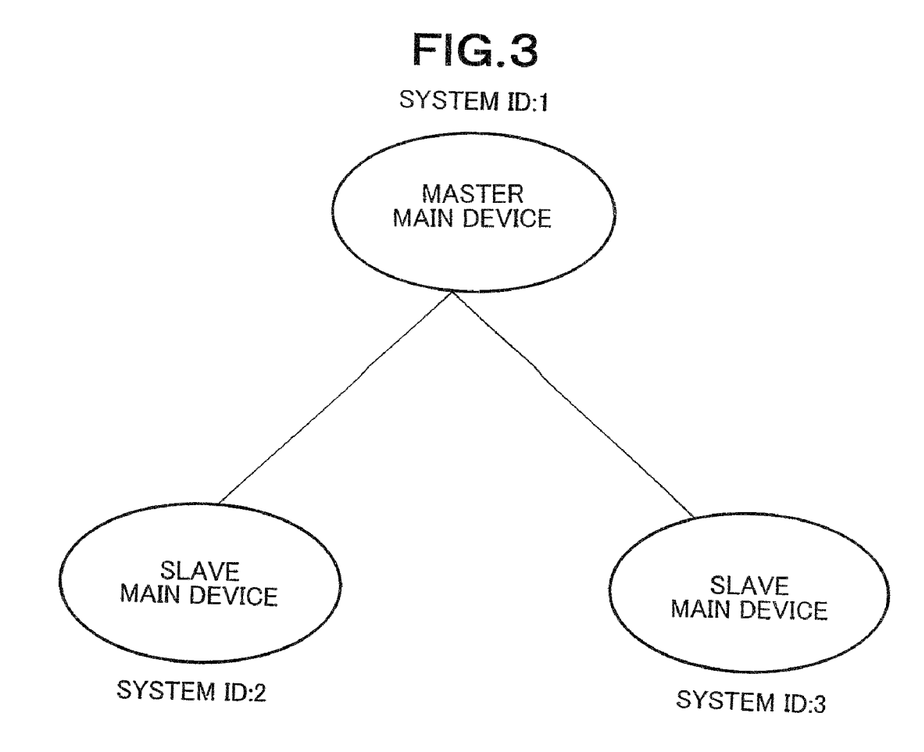
FIG. 3 is a conceptual diagram showing another example of connection among the master main device and the slave main devices according to the embodiment.

FIG. 3 shows a system configuration on the networking system architecture.

Only one master is present on the network and controls all slaves.

To identify each main device (system) on the network, the systems are given unique system IDs, respectively.

Figure 4:
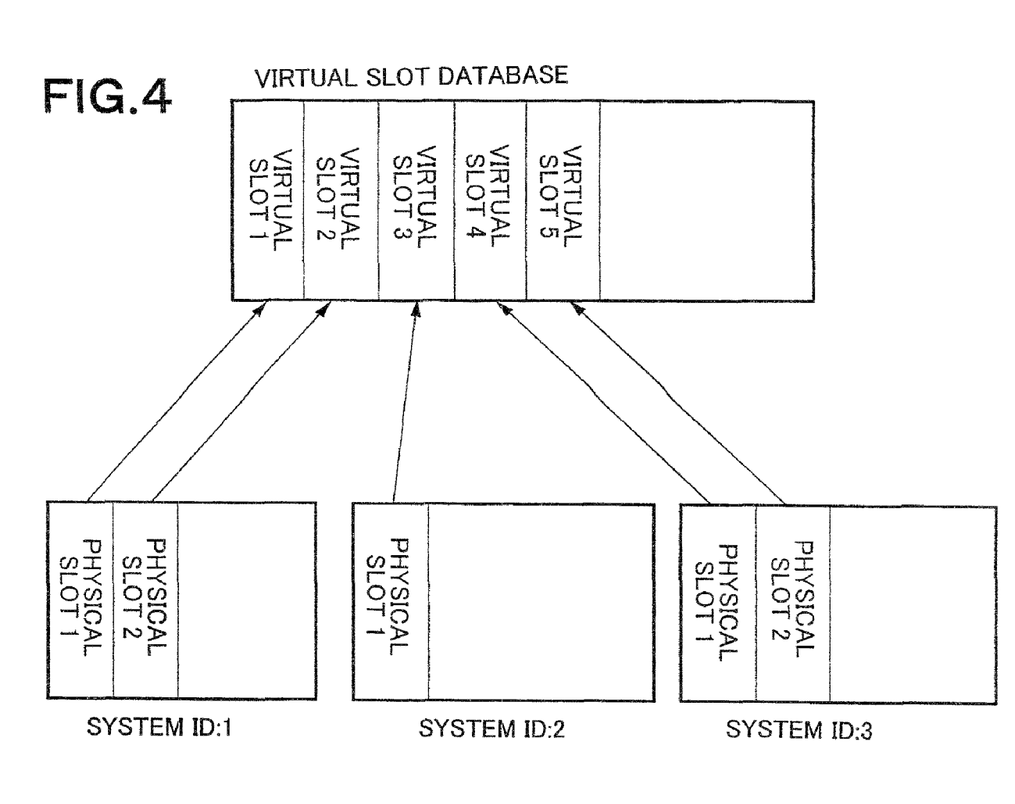
FIG. 4 is a conceptual diagram showing correspondence between virtual slots and physical slots according to the embodiment.

FIG. 4 is a conceptual diagram of slot management according to the embodiment.

Packages are physically installed into slots of each of the systems connected to the network and having the systems ID, respectively. Information on the packages is unitarily integrated into a virtual slot database and the master (system) manages the virtual slot database.

The master controls slots while referring to this virtual slot database.

If slots belong to the system other than the master, the slots are present physically at a remote location connected to the master by an IP network. However, the master can handle the slots as if they are its own slots without knowledge that the physical slots are at remote locations.

Therefore, the master can handle terminals and lines connected to the packages installed into the slots as if they are terminals and lines connected to the master.

Figure 5:
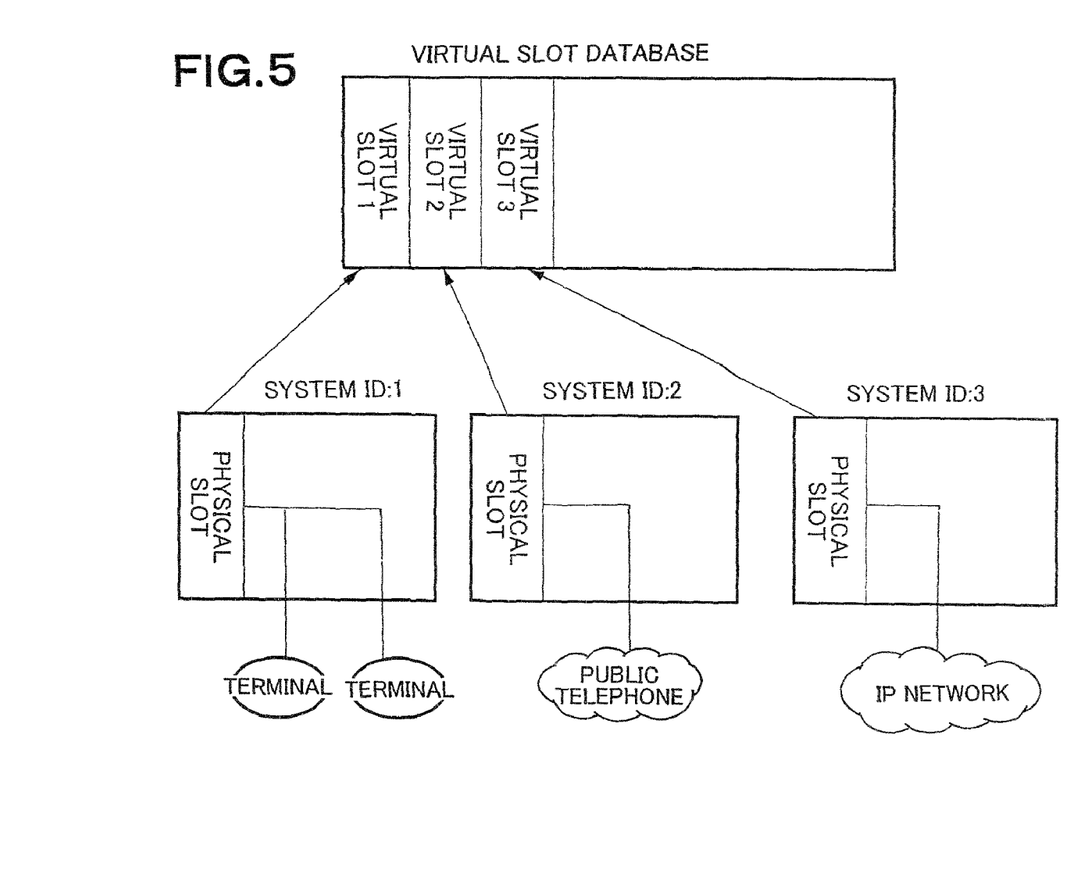
FIG. 5 is a schematic diagram showing correspondence between the virtual slots and the physical slots and showing an example of connection destinations of the respective physical slots according to the embodiment.

FIG. 5 shows the systems representing the above-stated manners.

Packages connecting terminals, packages accommodating therein lines connected to a public line, and packages accommodating therein IP lines connected to the IP network are installed into a system having system ID: 1, a system having system ID: 2, and a system having system ID: 3, respectively.

Since physical slots of these systems are managed as virtual slots in the virtual slot database, each of the systems can freely control the terminals, lines and the like accommodated in the packages connected to the slots as if they are its own terminals, lines and the like.

By adopting the resource management method, even the systems distributed on the network can use functions of the other systems without restrictions.

As shown in FIG. 3, the systems shown in FIG. 5 are built on a client-server architecture in which one master controls slaves. The master performs call processings on all the main devices including the master and manages the database. The master also manages virtual slots.

The systems are connected to one another according to an internet protocol (IP) and given system IDs unique to the systems, respectively.

The systems 1, 2, and 3 include packages accommodating therein terminals, packages accommodating therein ordinary lines, and packages accommodating therein IP lines, respectively.

The virtual slot database manages information on these packages. While the master basically manages the data, each of the slaves holds the same data in case of replacement of the master.

The example shown in FIG. 5 will be additionally described from viewpoints of data flow.

Figure 6:
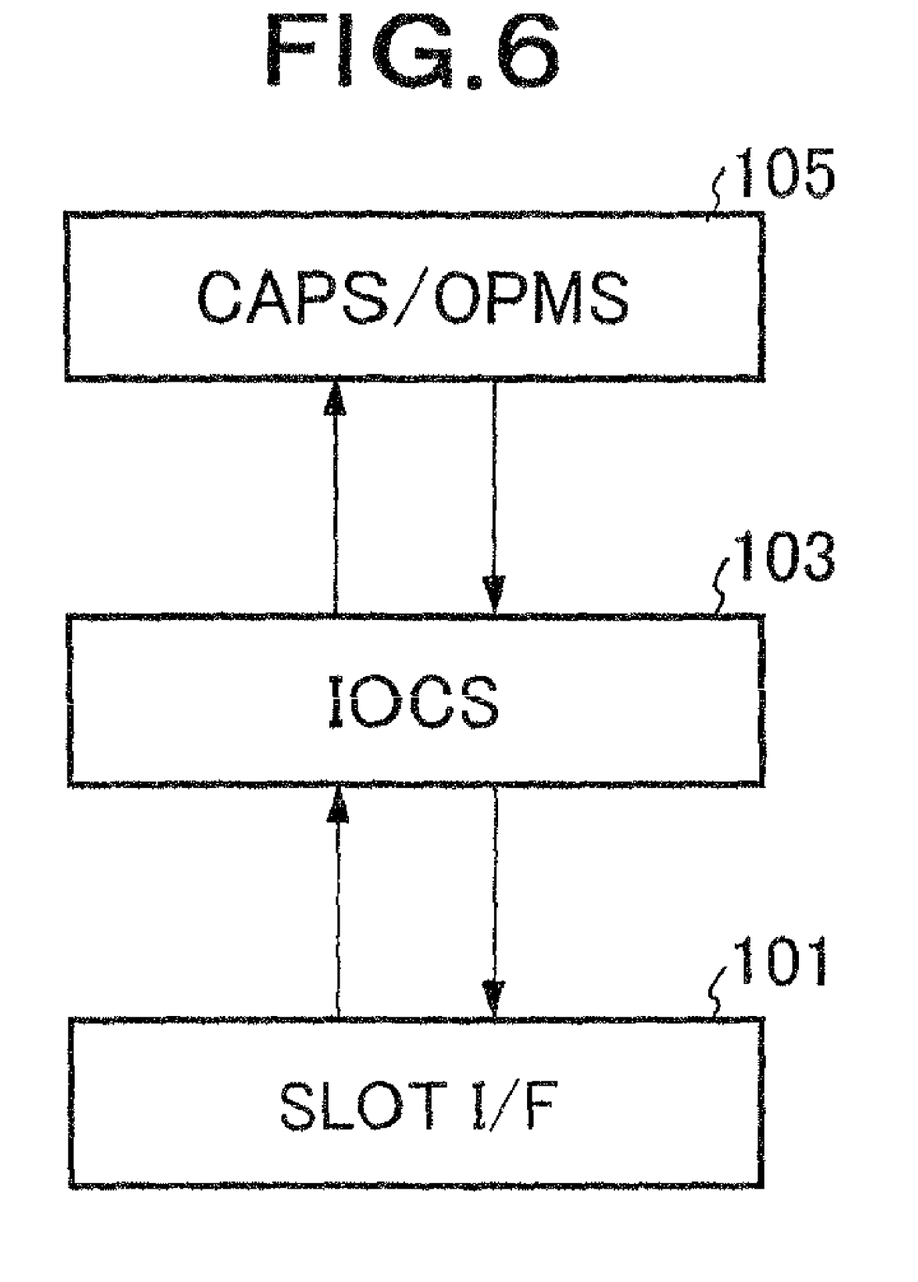
FIG. 6 is a schematic diagram showing a connection relation among CAPS/OPMS, IOCS, and a slot interface according to a conventional example.

FIG. 6 shows data flow for conventional package control.

As shown in FIG. 6, upstream data from a package is transmitted from a slot I/F module 101 to a CAPS (call control module)/OPMS (package and terminal management module) 105 via an IOCS (input/output control module) 103.

The CAPS/OPMS 105 processes the upstream data and transmits a downstream command to the slot I/F module 101 via the IOCS 103. For example, if a package is installed into a slot, then data is transmitted to the CAPS/OMPS 105 as upstream data, and the CAPS/OMPS 105 recognizes package installation and exercises a starting control over the package, i.e., permits the package to be active. If a terminal connected to the package installed into the slot is off the hook, the slot I/F module 101 transmits data indicating that the terminal is off the hook to the CAPS/OPMS 105 as upstream data. In response to the upstream data, the CAPS/OPMS 105 transmits a command to produce a dial tone from the terminal to the slot I/F 101 via the IOCS 103 as downstream data.

In FIG. 6, the data from the slot I/F 101 is directly transmitted to the higher module as input data, so that the system concerned can naturally control only the slot connected to the system.

Figure 7:
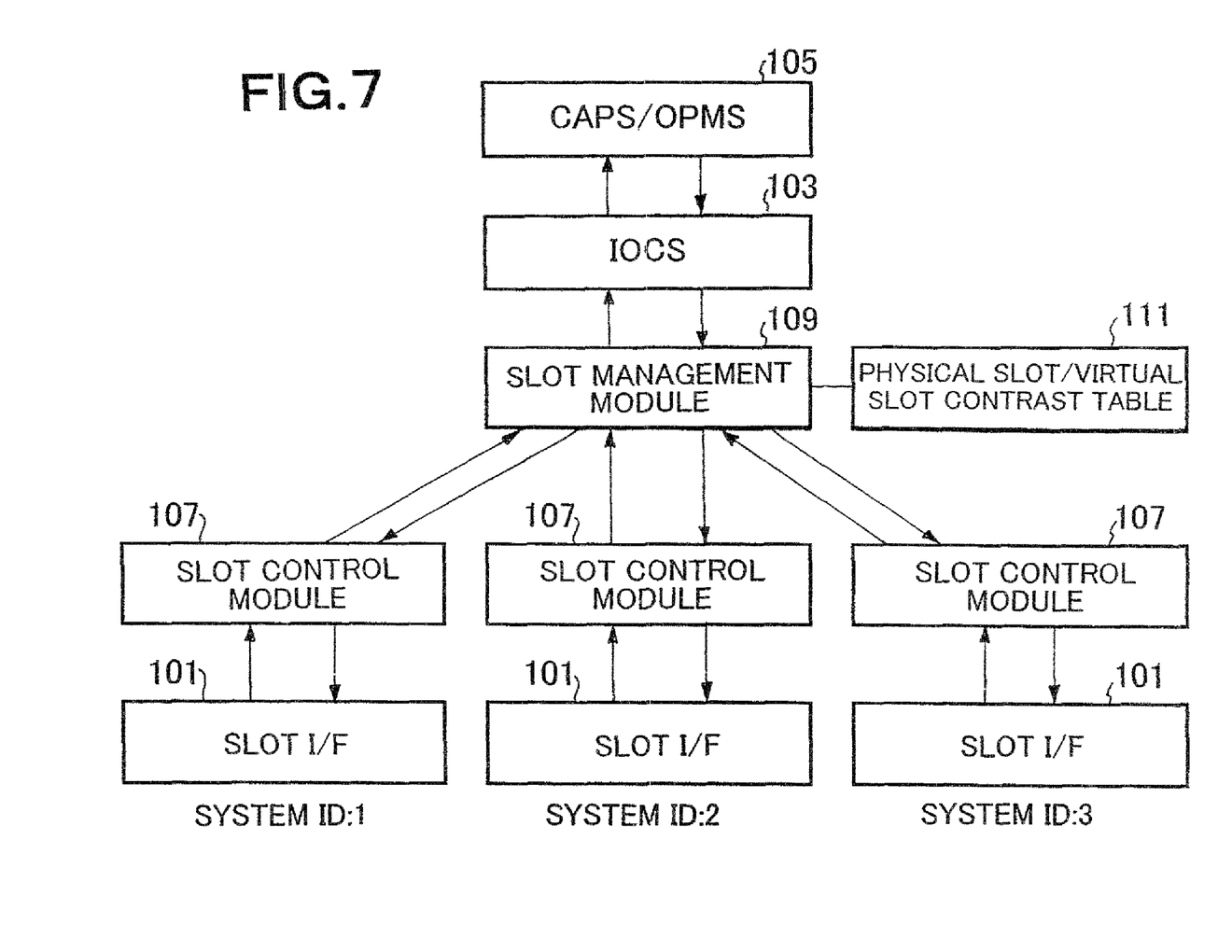
FIG. 7 is a schematic diagram showing a connection relation among the CAPS/OPMS, the IOCS, a slot management module, a physical slot/virtual slot contrast table, slot control modules, and the slot interface according to the embodiment of the present invention.

FIG. 7 shows data flow according to the embodiment.

As shown in FIG. 7, in the embodiment, slot management by networking is realized by additionally providing slot control modules 107 each controlling slot input/output and a slot management module 109 managing slot information.

Upstream data from one slot is subjected to a temporary spooling by one of the slot control modules 107 corresponding to a system including the slot and then transmitted to the slot management module 109 of the master controlling the system. If the system is the master, the upstream data is transmitted to its own slot management module 109. The management module 109 exercises such a control that it appears to the IOCS 103 that is a higher module that the data transmitted to the slot management module 109 is transmitted from a certain slot.

Operation performed by the slot management module 109 will be described in more detail with reference to a table of FIG. 8.

If the slot management module 109 receives data from a specific slot of a certain system and the specific slot is a slot of the system that has not been recognized so far, the slot management module 109 newly assigns a virtual slot number to the slot and subsequently regards the slot of the system as the slot to which the virtual slot number is assigned.

For example, if data is transmitted from a slot 1 of a system 1 and the slot 1 is the slot that has not been recognized so far, a virtual slot number 1 is assigned to the slot 1.

Figure 8:
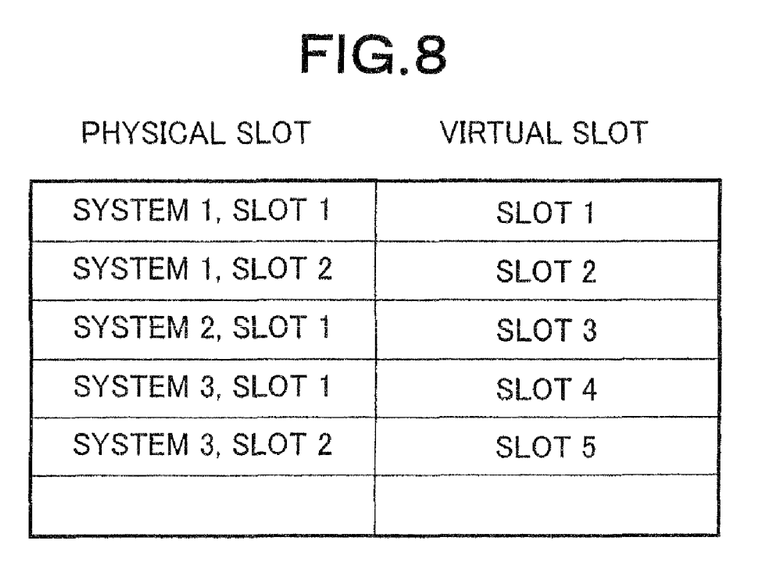
FIG. 8 shows a specific example of a physical slot/virtual slot contrast table according to the embodiment.

In this manner, if virtual slot numbers are newly assigned to slots so as to act as virtual slots, respectively, a physical slot/virtual slot contrast table 111 as shown in FIG. 8 is created.

Thereafter, the higher module such as the IOCS 103 or the CAPS/OPMS 105 regards the data transmitted from the slot 1 of the system 1 as data from its own slot 1 even without knowledge of the network.

If downstream data is to be actually transmitted to a slot to issue a command to hardware, the command is issued to a slot of an appropriate system while referring to the physical slot/virtual slot contrast table 111.

The command is transmitted to the slot control modules 107 of the systems and commands are transmitted to actual packages of the systems, respectively.

In this manner, by introducing the modules 107 and 109 controlling or managing slots on the network, there is no need to have knowledge of the network during most parts of the processings performed by the systems (main devices) and it is possible to control hardware as if the module controls the system corresponding to the module.

Differently from hardware limitation on the number of physical slots, no limitation is set to the number of virtual slots but an unlimited number of virtual slots can be assigned as long as a memory of each system can afford.

Generally, in each of the systems, processings are performed using virtual slot numbers. However, in parts visible to a user such as setting of system data, it is often desired to perform a processing while identifying by which slot in which system the processing is performed.

In that case, settings and the like can be made using physical slots while referring to the physical slot/virtual slot contrast table 111.

Although the exemplary embodiments of the present invention have been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

What is claimed is:

1. A slot interface access device comprising:
 a slot management module;
 a slot control module; and
 a physical slot to management slot contrast table,
 wherein the slot management module, the slot control module, and the physical slot to management slot contrast table are provided between an input and output control module and a slot interface architecturally lower than the input and output control module, the input and output control module being a layer below an application layer of the slot interface access device, the input and output control module accesses the slot interface using virtual slot identification information, and the slot management module converts the virtual slot identification information into physical slot identification information while referring to the physical slot to management slot contrast table, and accesses the slot control module corresponding to the physical slot identification information, thereby realizing a physical access of the input and output control module to the slot interface.

2. The slot interface access device according to claim 1, further comprising a unit for adding a new virtual slot if a new slot interface is added, and adding a correspondence between identification information on the slot control module corresponding to the added slot interface and identification information on the added virtual slot to the physical slot to management slot contrast table.

3. The slot interface access device according to claim 1, wherein the slot interface and the slot control module are present to be distributed to a plurality of main devices.

4. A slot interface access method for a device including a slot management module; a slot control module; and a physical slot to management slot contrast table, the slot management module, the slot control module, and the physical slot to management slot contrast table being provided between an input and output control module and a slot interface architecturally lower than the input and output control module, the slot interface access method comprising:

causing the input and output control module to access the slot interface using virtual slot identification information, and causing the slot management module to convert the virtual slot identification information into physical slot identification information while referring to the physical slot to management slot contrast table, and to access the slot control module corresponding to the physical slot identification information, thereby realizing a physical access of the input and output control module to the slot interface, wherein the input and output control module being a layer below an application layer of the slot interface access device.

5. The slot interface access method according to claim 4, further comprising adding a new virtual slot if a new slot interface is added, and adding a correspondence between identification information on the slot control module corresponding to the added slot interface and identification information on the added virtual slot to the physical slot to management slot contrast table.

6. The slot interface access method according to claim 4, wherein the slot interface and the slot control module are present to be distributed to a plurality of main devices.

7. A computer readable recording medium with a computer program recorded thereon comprising codes that, when executed, cause a computer to perform a slot interface access method for a device including a slot management module; a slot control module; and a physical slot to management slot contrast table, the slot management module, the slot control module, and the physical slot to management slot contrast table being provided between an input and output control module and a slot interface architecturally lower than the input and output control module, the slot interface access method comprising:

causing the input and output control module to access the slot interface using virtual slot identification information, and causing the slot management module to convert the virtual slot identification information into physical slot identification information while referring to the physical slot to management slot contrast table, and to access the slot control module corresponding to the physical slot identification information, thereby realizing a physical access of the input and output control module to the slot interface, wherein the input and output control module being a layer below an application layer of the slot interface access device.

8. The computer readable recording medium according to claim 7, wherein said method further comprises adding a new virtual slot if a new slot interface is added, and adding a correspondence between identification information on the slot control module corresponding to the added slot interface and identification information on the added virtual slot to the physical slot to management slot contrast table.

9. The computer readable recording medium according to claim 7, wherein the slot interface and the slot control module are present to be distributed to a plurality of main devices.

* * * * *